United States Patent [19]

Bjerregaard

[11] Patent Number: 4,537,333

[45] Date of Patent: Aug. 27, 1985

[54] AIRBORNE PARTICLE DISPENSER

[75] Inventor: Richard S. Bjerregaard, Boise, Id.

[73] Assignee: Eli Lilly and Company, Indianapolis, Ind.

[21] Appl. No.: 285,346

[22] Filed: Jul. 20, 1981

[51] Int. Cl.[3] .............................................. G01F 11/10

[52] U.S. Cl. .................................... 222/345; 222/368; 222/505

[58] Field of Search ............... 222/351, 328, 623, 624, 222/625, 310, 367, 368, 344, 505, 608, 609, 626, 627, 345, 346; 74/97, 100 R; 414/219, 220

[56] References Cited

U.S. PATENT DOCUMENTS

| | | | |
|---|---|---|---|
| 980,918 | 1/1911 | Brousseau | 222/368 |
| 1,040,888 | 10/1912 | Comrie | 222/625 |
| 2,504,580 | 6/1946 | Pierson | 222/318 |
| 2,906,438 | 9/1959 | Carpenter | 222/345 X |
| 3,052,383 | 9/1962 | Transeau | 222/345 |
| 3,118,575 | 1/1964 | McCauley | 222/368 |

FOREIGN PATENT DOCUMENTS

| | | | |
|---|---|---|---|
| 202660 | 7/1956 | Australia | 222/505 |

*Primary Examiner*—F. J. Bartuska

*Attorney, Agent, or Firm*—Barnes & Thornburg

[57] ABSTRACT

An airborne apparatus for dispensing particulate agricultural materials in precise dosages includes a rotor to uniformly deliver the particulate material from a container carried by the aircraft to a dispensing opening. A blade is provided adjacent the periphery of the rotor. The blade and the periphery of the rotor cooperate to reduce the interference of particulate material with operation of the rotor. A multi-part rotor housing provides adjustability for a variety of particulate materials. Such housing includes an arcuate housing portion and a gate-forming housing portion. The gate-forming housing portion and arcuate housing portion may be hinged to the remainder of the housing and form a dispensing opening. The arcuate housing portion can be adjusted with respect to the periphery of the rotor and can provide a reservoir of adjustable capacity between the dispensing opening and the rotor periphery. The gate housing portion is held in its normal position against the arcuate housing portion to close the dispensing opening but is movable to a position in which the dispensing opening is open.

10 Claims, 6 Drawing Figures

AIRBORNE PARTICLE DISPENSER

It is frequently desirable to make a broadcast application of particulate material to large areas of land. Such applications include the distribution of fertilizer, seed, and pesticides, including, for example, insecticides, herbicides, and fungicides. It is desirable to make such applications in a short time while maintaining carefully controlled dosages and permitting their application within relatively precisely delineated boundaries of the land's surface. In many applications, airborne distribution of pesticides, fertilizers, and other agricultural chemicals represents the only manner in which such applications can be made. Pesticides and agricultural chemicals are frequently manufactured in pelletized particulate form to deliver the active ingredient to the soil surface and prevent drift in application to non-target areas. The application of such pelletized materials without breakage or disintegration, in the form in which they are manufactured, is desirable to permit control of the beneficial effects of such materials.

A number of methods exist for applying particulate material to large areas of land. One such means is a dispenser, including a hopper for the particulate material, having a closure door below a plate with a series of apertures from which the particulate material is dispensed and means for varying the size of the apertures. One such means includes a pair of plates, one having a row of apertures and the other adjustably mounted to permit variable overlapping of the apertures and selective control of the size of the apertures through which the material passes. Such means, however, have not been entirely satisfactory since pelletized particulate material tends to bridge over the opening, stopping the flow. Agitators have been used to reduce the bridging, but bridging still occurs when apertures are small. Furthermore, the flow rate from this type of applicator may vary as the hopper contents are reduced.

A second such means for applying particulate material utilizes a revolving member which has recesses in it for receiving the particulate material. In its construction, each recessed surface of the revolving member catches material from a container and then dumps it through an exit chute for application. Use of the revolving member avoids the substantial problem of clogging which exists with the first means discussed above. The exit openings used with revolving members generally have fixed dimensions substantially large enough to avoid any problem of clogging. Scrapers or brushes which bear against the periphery of the revolving member are provided to level off materials received in the recessed surface and to prevent leakage when the member is not revolving, but they tend to crush the particles and increase the power needed to operate such means.

One recent means of applying particulate materials includes a variable-speed fluted roller coupled with adjustable drive means and positioned under the exit chute of a hopper containing particulate material to provide a metered flow of material from the hopper. In operation, the particulate material passes from the hopper container into a housing containing the fluted roller and fills the space between the inner surface of the housing and the rotor. The rotor is arranged horizontally and its rotation urges a flow of material, through contact with its fluted periphery, through the housing, to an opening. The opening in the rotor housing, from which the particulate material is dispensed, is provided with a gate that can be selectively closed to block passage of the material when the rotor is not energized. The rotor housing adjacent the opening, from which material is dispensed, has an arcuate cross section forming a lip above the bottom of the housing over which particulate material is urged.

This invention represents an improved airborne apparatus for dispensing particulate materials, such as pelletized pesticide materials in controllable dosages. Such apparatus includes means, capable of mounting on an aircraft, to uniformly meter the particulate material from a container or hopper in the aircraft to a dispensing opening. The dispensing means includes a horizontal rotor that is located adjacent the bottom of the container within a rotor housing. The horizontal rotor is in communication with the interior of the container or hopper, and includes an impelling outer surface that effects at least one recessed cavity. Particulate material from the container is collected by the rotor and moved to the dispensing opening. The rotor periphery is formed by the peripheral edge or edges of the impelling surface of the rotor, and a blade is provided adjacent the rotor periphery. The blade and rotor periphery cooperate to reduce the power and torque required to turn the rotor during operation of the apparatus.

The blade edge and the peripheral edge or edges of the impelling rotor surface are angularly oriented at a single point, or at a plurality of points, when they are closely adjacent, to reduce the quantity of particulate material adjacent their intersection or intersections where it may be trapped between the blade edge and the peripheral edge or edges of the rotor. Where the peripheral edges of the rotor are parallel to the rotor axis of rotation, the blade may have an undulating edge, and where the blade has a straight edge parallel to the rotor axis of rotation, the edges at the periphery of the rotor may be spiraled about its axis of rotation. The blade edge may be sharpened and the leading portions of peripheral edges of the rotor may be rounded to further urge particles to escape being crushed. Pelletized particulate materials can have ball-like properties in movement, and such rotor-blade combinations can provide forces acting on the pellets adjacent the blade intersection, or intersections, that urge the pellets to move away from the intersection. In addition, a baffle may be provided above the blade to dissipate the effect of the weight of the particulate material above the rotor, reducing further the torque load imposed on the rotor and permitting particles adjacent the rotor-blade intersection to move more freely. Thus, the power and torque required to operate the rotor may be reduced; the rotor may be started more reliably and rotated more uniformly for given available power; and particle breakage may be reduced as the periphery of the rotor moves adjacent the blade edge.

The apparatus of the invention also includes a multipart rotor housing adapted to block the flow of particulate material, except under the influence of the rotor, and to provide adjustability for a variety of particulate materials and particle sizes. Such a housing can include, in addition to the blade, which can be adjustably fastened to the housing, an arcuate portion, which can be adjustably fastened to the remainder of the housing, and a gate-forming portion. The arcuate housing portion and the gate-forming housing portion define sides of the dispensing opening, with one end of the first arcuate portion forming the dispensing edge over which particles are urged. The gate-forming portion is movably fastened to the remainder of the housing and, in its normal closed position, is held in contact with the dispensing edge to close the dispensing opening but is movable to a position where the dispensing opening is open.

In one embodiment where the edges of the impelling rotor surface that form the periphery of the rotor are parallel to the rotor axis of rotation, the blade forms a part of the rotor housing adjacent the container opening, has a serrated edge that is located adjacent to the periphery of the rotor, and carries, at its other remote end, the first arcuate housing portion. The first arcuate housing portion has a first part with radius of curvature approximately that of the rotor periphery and extends from this arcuate part into a straightened part leading to the dispensing edge to form, between the periphery of the rotor and the dispensing edge, a reservoir with an adjustable volume to reduce the pulsations in flow of particulate material over the edge. In another embodiment where the blade has a straight edge that is parallel to the rotor axis of rotation, the peripheral edges of the impelling surface of the rotor spiral about the rotor axis of rotation. This latter embodiment can provide a more uniform supply of particles to the dispensing opening of the apparatus. In one embodiment, the gate-forming portion is held in its normal closed position by a spring, and in another embodiment, the gate-forming portion is held in its normal closed position by a resilient operator and over-center actuating mechanism.

Figure 1:
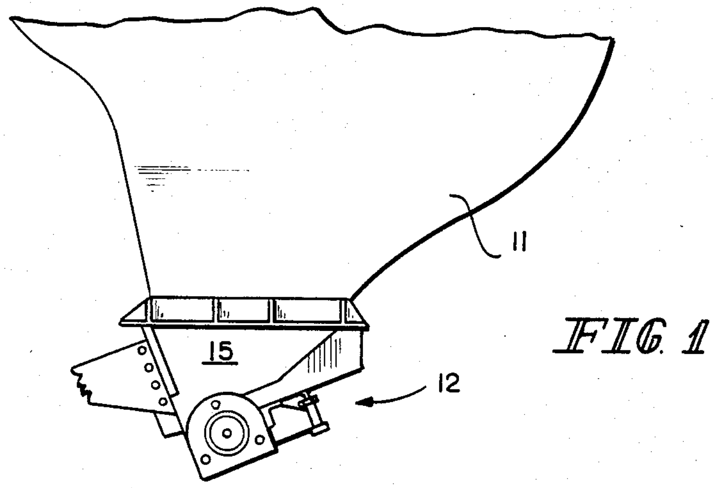
FIG. 1 is a side view of one apparatus of this invention, showing only part of the container.

Referring to FIG. 1, a large hopper 11 is illustrated which is typical of the containers used in aircraft for the distribution of agricultural chemicals. However, containers of other configurations may be used with apparatus of this invention.

A dispensing apparatus 12 may be fastened adjacent the bottom of the container 11 and may or may not incorporate a container portion 15. The dispensing apparatus may be adapted to mount directly to the hopper or container in the aircraft and replace the hopper gate in standard agricultural aircraft. The particulate material dispenser 12 may be operated remotely from the cabin of the aircraft through controls which are not shown. Such controls can affect variation in the rotation of the dispenser rotor, for example, through a variable speed electric motor. Although operation of the rotor by electrical means is preferable, a hydraulic or compressed air source may be used to energize a variable speed hydraulic or air motor. Where an electric motor is used, it is preferably one designed for aircraft use, including a gear box to provide speed reduction and torque requirements suited to the rotation of the dispensing rotor. Conveniently, a tachometer can be provided in the aircraft cockpit to indicate the speed of rotation of the dispensing rotor and thereby indicate the application rate of the dispenser. In a manner to be described, the flow of particulate materials from the dispenser is blocked by a gate unless the gate is positively opened from the cockpit of the plane by a mechanical interconnection.

Figure 2:
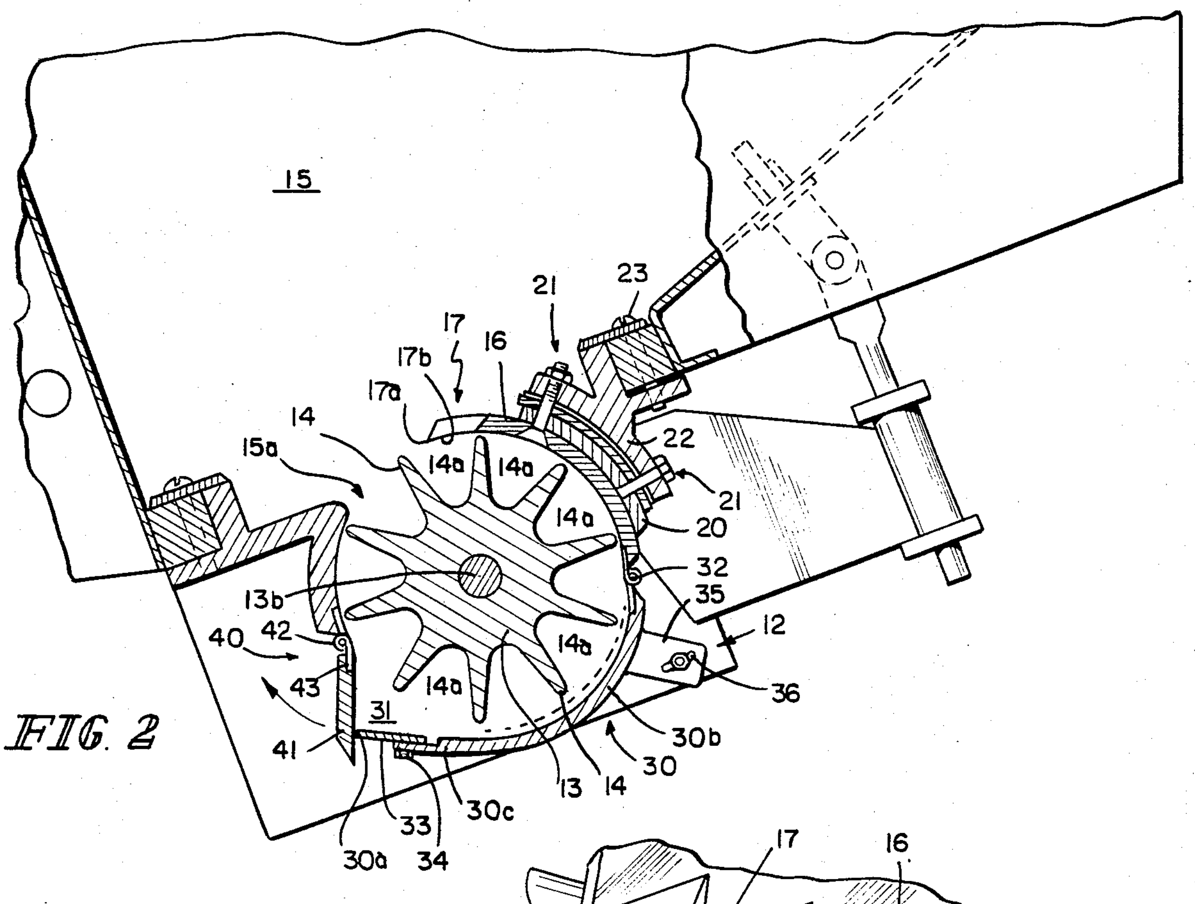
FIG. 2 is a cross-sectional side view of the apparatus of FIG. 1.

One specific structure of the improved airborne particle dispenser of this invention is more fully shown in a cross-sectional view of FIG. 2. As shown in FIG. 2, the means 12 to uniformly deliver particulate material from the container to a dispensing opening includes a horizontal rotor 13 whose periphery forms an impelling surface 14 with a plurality of cavities **14*a*. The rotor 13 is located adjacent the bottom of the container portion 15 and communicates with the interior of container 15 through an opening 15*a*. A blade 16 is mounted adjacent the opening 15*a* and the periphery of rotor 13.**

Figure 3:
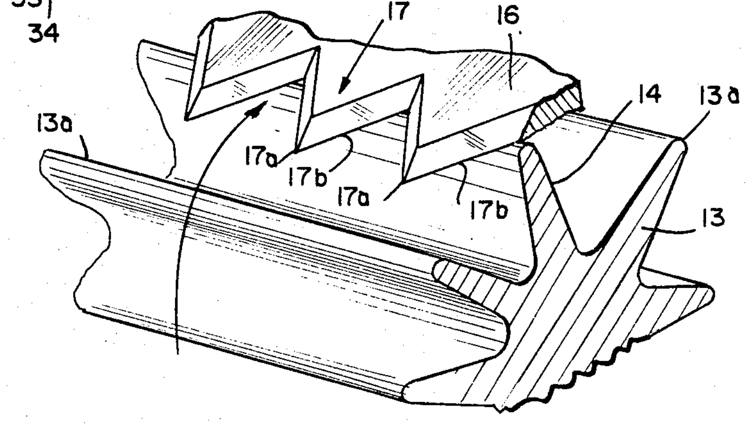
FIG. 3 is a broken-away perspective view of a portion of the rotor and the adjacent undulated blade edge of the apparatus of FIG. 1.

Blade 16 is provided with a sharpened edge 17. The interaction between the periphery of rotor 13 and the edge 17 of blade 16 may be more clearly understood by reference to FIG. 3. Particulate material being moved by rotor 13 is intercepted by the forwardmost portions **17*a* of edge 17. In its serrated embodiment, the undulated edge 17 presents only a plurality of points 17*a* and edges 17*b* against which the particulate material may be compressed by the peripheral edges 13*a* of rotor 13. Because of the angular orientation between the blade edges 17*b* and the peripheral edges 13*a* of the rotor, particulate material at the periphery of rotor 13 is urged to travel along the undulating and beveled edge 17 of blade 16 and to avoid compression and fracture between the peripheral edges 13*a* of the rotor and the edges 17*b* of the blade 16.**

Furthermore, blade 16 can be adjustably fastened to the dispenser structure, as shown in FIG. 2. Such adjustable fastening can include a shim 20 and the provision of slots (not shown) in blade 16. The axis **13*b* of the rotor 13 is carried by the structure of the dispensing apparatus 12 at a fixed location with respect to container 15. The blade 16 is fastened, for example, by a plurality of threaded fasteners such as screws and nuts 21, shown in FIG. 2. Conveniently, a bracket 22 is fastened to container 15 by fasteners such as screws 23 at the container opening. Thus, the clearance between the blade 16 and the rotor 13 can be varied by removal of the fasteners 21 and introduction of shims 20 having different thicknesses. Furthermore, the degree to which the blade 16 extends into the container opening 15*a* may also be adjusted by loosening fasteners 21 and repositioning the blade 16 with respect to the container 15 by sliding the blade 16 along its slotted portion through which fasteners 21** extend.

The blade 16 may extend from the container opening **15*a*** and form part of the rotor housing.

As shown in FIG. 2, the housing of the dispensing means 12 includes several parts encompassing the rotor and forming the dispensing opening. The first portion 30 of this housing forms the edge **30*a* from which the particulate material falls. The first portion 30 includes an arcuate part 30*b* at one end, having a radius of a curvature about equal to but slightly larger than the radius of the rotor. The first portion 30 extends from the arcuate portion 30*b* into a straightened part 30*c* adjacent the dispensing edge 30*a*. The space 31 formed between the periphery of the rotor 13 and the straighted part 30*c* of the first housing portion provides a reservoir for particulate material adjacent the dispensing edge 30*a*. The first housing part 30 is adjustably fastened, as, for example, through hinge 32, with respect to the rotor 13. In the embodiment shown in FIG. 2, the blade 16 extending arcuately from the container opening 15***a* forms a part of the rotor housing and carries the hinge 32 and the first housing part 30 remote from the undulated edge 17. The volume of the reservoir space 31 may be varied by varying the position of the first housing portion 30 with respect to the rotor 13 through the adjustability of the hinge 32, threaded fastener 36, and the slotted portion 35 of the first housing portion. The straightened part 30*c* of the first portion 30 may also include a separate member 33 that carries the dispensing edge 30*a* and provides, through the use of threaded fasteners 34 and slots in part 33, an ability to extend the straight part 30*c* of first portion 30.

A second housing portion 40 includes a gate-forming portion 41 which, by means of a hinge 42, is movable with respect to the dispensing edge 30*a*. In its normal closed position, the second gate-forming housing portion 41 is biased against the dispensing edge 30*a* by a resilient member or spring 43. Through hinge 42 and a solenoid-driven actuator (not shown), gate 41 is movable to a position out of contact with the dispensing edge 30*a*, thus forming a dispensing opening between the gate 41 and dispensing edge 30*a*.

In operation, the rotor 13 (which rotates clockwise, as viewed in FIG. 2) carries particulate material from the interior of container 15 to the space 31. Because of the reservoir effect of space 31, pulsations in the rate of flow of particulate material are dampened; and a more uniform flow of particulate material is presented to dispensing edge 30*a*. In operation, gate 41 will be moved to the open position at the same time rotation of rotor 13 commences.

The location of blade 16 and first body portion 30 with respect to the rotor 13 is selected depending upon the nature of the particulate material to be applied and the size of the particles.

Figure 5:
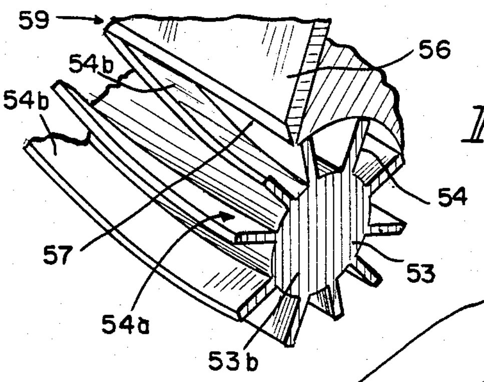
FIG. 5 is a broken-away perspective view of a portion of the apparatus of FIG. 4 and the angular orientation of the rotor periphery and the blade edge.
Figure 6:
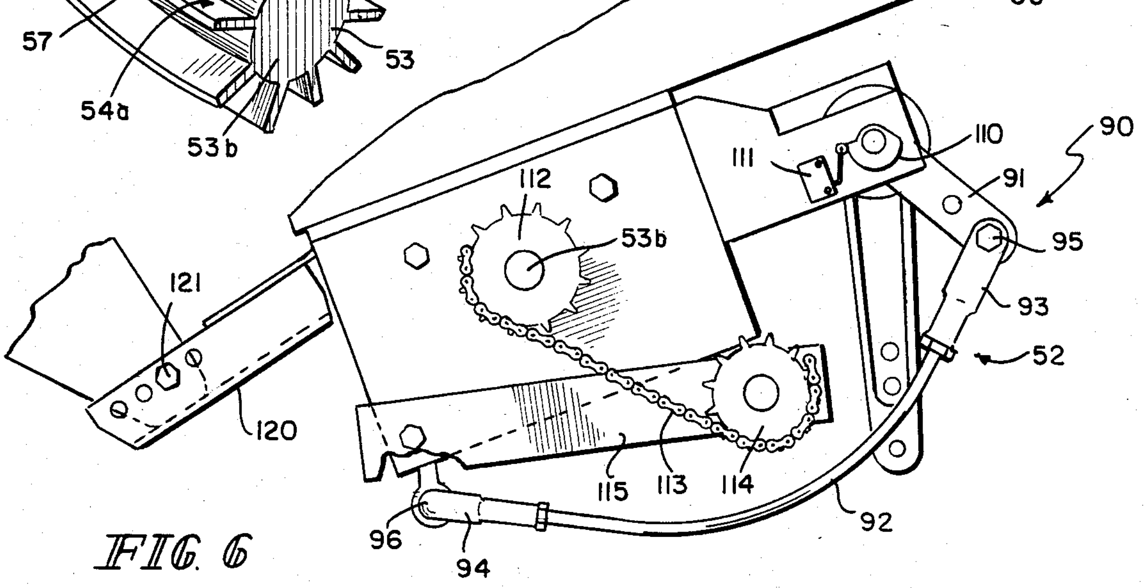
FIG. 6 is a side view of the apparatus of FIG. 4.
Figure 4:
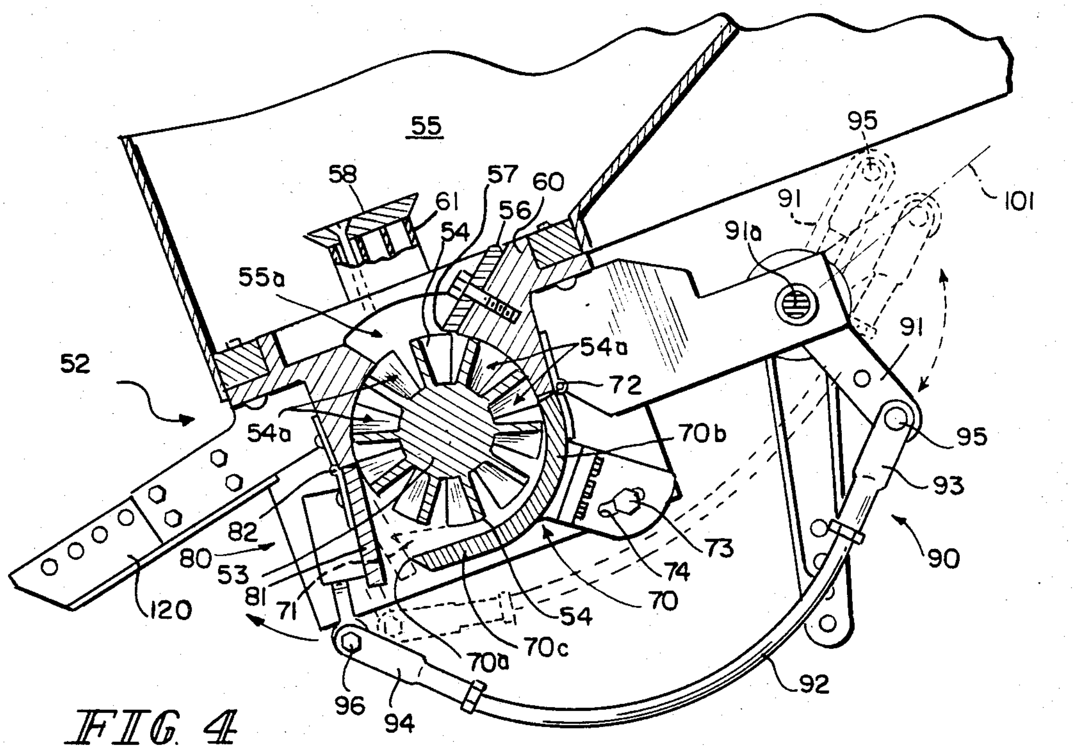
FIG. 4 is a cross-sectional side view of another embodiment of the apparatus of this invention.

Another embodiment of the improved airborne particle dispenser of this invention is shown in FIGS. 4–6. As shown in cross-sectional view in FIG. 4, the means 52 to uniformly deliver particulate material from the container to a dispensing opening includes a horizontal rotor 53 whose periphery forms an impelling surface 54 with a plurality of recesses 54*a*. The rotor 53 is located adjacent the bottom of the container 55 and communicates with the interior of container 55 through an opening 55*a*. The housing of means 52 includes a casting 60 that is carried by container 55 and forms opening 55*a*. A blade 56 is mounted to the housing so that it is adjacent to and forms, in part, opening 55*a* and is adjacent to the periphery of rotor 53.

The interaction between the periphery of rotor 53 and the edge 57 of blade 56 may be more clearly understood by reference to FIG. 5. The impelling surface 54 of the rotor 53 and its peripheral edges 54*b* are spiralled about the rotor axis of rotation 53*b*, and the blade edge 57 is straight and parallel to the rotor axis of rotation 53*b*. Particulate material being moved by rotor 53 can be compressed between the forwardmost straight edge 57 of blade 56 and the peripheral edges 54*b* of the rotor only adjacent a single angularly oriented intersection 59.

Furthermore, blade 56 can be adjustably fastened to the casting portion 60 of the housing. The blade 56 may be in one or more pieces depending upon the complexity of the housing. The housing structure may include a baffle 58 supported above opening 55*a*. The baffle 58 is supported from casting 60 by stand-off supports 61. The baffle 58 supports some of the weight of the particulate material above the means 52, reducing the torque load imposed by the particulate material on the rotor on start-up and in operation. The baffle can reduce the power and torque required to operate the rotor and permit the rotor to be started more reliably and rotated more uniformly for given available power and can permit the particulate material adjacent blade edge 57 greater freedom of movement.

As shown in FIG. 4, the housing of the dispensing means 52 includes several parts encompassing the rotor and forming the dispensing opening. The first portion 70 of this housing forms the edge 70*a* from which the particulate material falls. The first portion 70 includes an arcuate part 70*b* at one end, having a radius of curvature about equal to but slightly larger than the radius of the rotor. The first portion 70 extends from the arcuate portion 70*b* into a straightened part 70*c* adjacent the dispensing edge 70*a*. The space 71 formed between the periphery of the rotor 53 and the straightened part 70*c* of the first housing portion provides a reservoir for particulate material adjacent the dispensing edge 70*a*. The first housing part 70 is adjustably fastened, as, for example, through hinge 72, for pivoted movement with respect to the rotor 54. In the embodiment shown in FIG. 4, the housing casting portion 60 carries the hinge 72 and the first housing part 70. The volume of the reservoir space 71 may be varied by varying the position of the first housing portion 70 with respect to the rotor 54 through the adjustment of the hinge 72 and the use of the threaded fastener 73 and slot 74 in the first housing portion.

A second housing portion 80 includes a gate-forming portion 81 which, by means of a hinge 82, is movable with respect to the dispensing edge 70*a*. In its normal position, the second gate-forming housing portion 81 is held against the dispensing edge 70*a* by the over-center mechanism 90. Through hinge 82, the gate 81 is movable to a position out of contact with the dispensing edge 70*a*, thus forming a dispensing opening between the gate 81 and dispensing edge 70*a*.

The over-center gate-actuating mechanism 90 includes an actuating lever 91 that rotates about an axis 91*a* and a resilient operator 92 that is fastened to the actuating lever 91 at one end and to the gate-forming housing portion 81 at the other end. The resilient member 92 is a bent, and generally arcuate, metal rod. The resilient operator 92 is fastened at its ends by couplings 93 and 94 that are threaded on each end of the bent rod 92. The couplings 93 and 94 pivot at their attachments 95 and 96 to the actuating lever 91 and gate-forming portion 81, respectively.

In the normal position (shown in the uppermost dashed lines in FIG. 4), the actuating lever 91 is rotated about axis 91*a* to a position where a line between attachments 95 and 96 lies above the axis 91*a*. The operating position of the over-center gate-actuating mechanism 90 is shown in FIG. 4 in solid lines. In the operating position, the resilient bent rod 92 is in its generally unstressed bent shape. In moving between the operating position and its normal closed position, the resilient bent rod 92 is straightened as the gate-forming housing portion 81 contacts the edge 70*a* of first housing portion 70 and as the actuating lever 91 carries the point of attachment 95 past line 101 between the point of attachment 96 when immovable and the axis of rotation 91*a*, as shown in the dashed lines in FIG. 4. The stress in the resilient bent rod 92 in its over-center normal position holds the gate-forming housing portion 81 against dispensing edge 70*a* of the first housing portion and prevents material from being dispensed.

In operation, the rotor 53 (which rotates clockwise, as viewed in FIG. 4) carries particulate material from the interior of container 55 to the space 71. Because of the reservoir effect of space 71 and the spiralled impelling surface 54 of rotor 53, pulsations in the rate of flow of particulate material are reduced; and a more uniform flow of particulate material is presented to edge 70*a*. In normal operation, gate 81 will be moved to the open position at the same time rotation of rotor 53 commences through the action of a cam surface 110 that is fixed to actuating lever 91 and a switch 111 (see FIG. 6).

Manual operation of the actuating lever 91 from the cockpit of the aircraft thus actuates switch 111 and applies electric power from a regulated power source to a motor (not shown) that drives rotor 53. The rotor 53 may be driven from a sprocket (not shown) connected to the motor through a driven sprocket 112 and chain 113. The chain drive may be provided with an idler sprocket 114 carried by an arm 115 that is spring-biased to take up slack in the chain 113. The means 52 may be conveniently supported in position on the aircraft by a bracket 120 and fasteners 121.

Since the rate at which particulate material is dispensed from the apparatus depends upon the rotary speed of the rotor, a highly accurate method of applying material results from apparatus of this invention. Because of the angular orientation between the peripheral rotor edge and the blade edge and the adjustable housing structure, the power and torque required to operate the rotor can be reduced, and the rotor may be started more reliably and rotated more uniformly and, depending upon the angular orientation, particulate material at the periphery of the rotor may be urged to move and to avoid compression and fracture between the peripheral edges of the rotor and the edge of the blade.

Although particular preferred embodiments are shown, other embodiments utilizing the invention will be apparent to those skilled in the art without departing from the scope of the invention as set forth in the following claims.

What is claimed is:

1. Apparatus for dispensing particulate agricultural material at controllable uniform rates from an aircraft in flight comprising:

a housing having an inlet opening for receiving particulate material by gravity flow from a container carried by the aircraft, and having a dispensing opening;

a horizontal rotor mounted in said housing in clearance relation with an arcuate portion of the housing and having a plurality of material-receiving pockets and intervening rotor edges for moving the material from the inlet opening to the dispensing opening; and a rigid blade fixed on said housing and having a blade edge in shear relation with said rotor edges, said rotor edges and blade edge being disposed so as to be angularly oriented with respect to each other in the shear plane as the rotor blades move in shear relation across the fixed blade and thereby to present single points of shear intersection and reduce crushing of the particulate material; and wherein the housing partially encompasses the rotor and also forms the dispensing opening, and wherein said housing has a first portion forming a dispensing edge of the dispensing opening from which the particulate material falls, said first portion being hinged to the remainder of the housing and including an arcuate part adjacent the hinge having a radius of curvature approximately that of the rotor periphery and further including a straightened part adjacent the dispensing edge, and wherein said housing has a second portion also hinged to the remainder of the housing, a resilient member for holding said second portion in engagement with the dispensing edge of the first portion in a normal closed position to thereby block the dispensing opening, the straightened part of the first portion forming, between the periphery of the rotor and the dispensing edge of the dispensing opening, a reservoir for particulate material moved thereto by said rotor, said first portion of the housing being adjustable to vary the volume of the reservoir.

2. Apparatus for dispensing particulate agricultural material at controllable uniform rates from an aircraft in flight comprising:

a housing having an inlet opening for receiving particulate material by gravity flow from a container carried by the aircraft, and having a dispensing opening;

a horizontal rotor mounted in said housing in clearance relation with an arcuate portion of the housing and having a plurality of material-receiving pockets and intervening rotor edges for moving the material from the inlet opening to the dispensing opening; and a rigid blade fixed on said housing and having a blade edge in shear relation with said rotor edges, said rotor edges and blade edge being disposed so as to be angularly oriented with respect to each other in the shear plane as the rotor blades move in shear relation across the fixed blade and thereby to present single points of shear intersection and reduce crushing of the particulate material; and wherein said fixed blade edge extends parallel to the axis of the rotor and the rotor edges extend in a spiral about such axis so as to cross the fixed blade edge in an angular shear relation.

3. An airborne apparatus for dispensing particulate agricultural materials at precise rates comprising:

a container for the particulate agricultural material carried by an aircraft; and means, including a horizontal rotor adjacent the bottom of the container and in communication, through a container opening, with the interior of the container, said rotor having pockets therein to uniformly deliver quantities of the particulate material from the container to a dispensing opening, said means including a housing partially encompassing said rotor and forming the dispensing opening, said housing having a first portion forming an edge of the dispensing opening from which the particulate material falls, said first portion including an arcuate part having a radius of curvature approximately that of the rotor periphery and extending into a straightened part terminating in the edge, said first portion being adjustable toward and away from the rotor, said housing having a second portion forming a gate and being held by a resilient member in engagement with the edge of the first portion in its normal closed position to thereby close the dispsensing opening, the periphery of the rotor and the straightened part of said first portion forming a reservoir to reduce pulsations in the flow of particulate material over the edge.

4. An airborne apparatus for dispensing particulate agricultural material comprising:

a container for the particulate material carried by an aircraft;

means, including a horizontal rotor partially encompassed by a housing adjacent the bottom of the container and in communication, through a container opening, with the interior of the container, to deliver the particulate material from the container to a dispensing opening, said rotor having a series of axially extending rotor blades thereon, and said housing having a blade thereon with an undulated edge at the container opening, said edge comprising a series of edge portions angularly disposed and in shearing relation with respect to said rotor blades;

a housing partially encompassing the rotor and forming the dispensing opening;

said housing having a first portion forming an edge of the dispensing opening from which the particulate material falls, said first portion including an arcuate part having a radius of curvature approximating that of the rotor periphery and extending into a straightened part that terminates at the dispensing edge, said straightened part forming between itself and the rotor a reservoir for particulate material adjacent said dispensing edge, and the housing first portion being adjustable toward and away from the rotor to vary the volume of such reservoir, said housing having a second portion that is movable with respect to the first portion between a first position against the dispensing edge to block the dispensing opening and second position that opens the dispensing opening, said second portion being resiliently biased to its said first position.

5. Airborne apparatus for dispensing particulate materials comprising:

means to uniformly deliver the particulate material from a container carried by an aircraft to a dispensing opening, said means including a horizontal rotor located adjacent the bottom of the container and in communication with the interior of the container; and a multi-part rotor housing in communication with the interior of the container through a container opening and adapted to block the flow of particulate material except under the influence of the rotor, said housing including a blade-supporting portion, an arcuate housing portion, and a gate-forming portion, the arcuate housing portion being adjustably fastened to the remainder of the housing, said arcuate portion and said gate portion having ends that form part of the dispensing opening, said gate portion being movable with respect to the arcuate portion and held in contact therewith to close the dispensing opening but movable by an operator to an open position where the dispensing opening is unobstructed, the gate-forming portion being hinged to the remainder of the housing for movement between its normal closed position in contact with the arcuate housing portion and its open position, and said operator including an over-center mechanism with an actuating lever movably carried by the housing and with a resilient operator member connected to the gate-forming portion at one end and connected to the actuating lever at the other end, said actuating lever being movable in one direction to move the gate-forming portion to its open position and movable in the opposite direction to close the dispensing opening and to flex the resilient operator member as the actuating lever is moved to an over-center position where the flexure of the resilient operator holds the gate-forming portion in its normal closed position.

6. The apparatus of claim 5 wherein the horizontal rotor forms an impelling surface with peripheral rotor edges and the blade has an edge adjacent the rotor periphery, said peripheral rotor edges and said blade edge being in shear relation and angularly oriented with respect to each other.

7. An airborne apparatus for dispensing particulate materials, comprising:

means, including a horizontal rotor partially encompassed by a housing adjacent the bottom of a container for the particulate material carried by an aircraft and in communication, through a container opening, with the interior of the container, to uniformly deliver the particulate material from the container to a dispensing opening; and a housing partially encompassing the rotor and forming the dispensing opening, said housing having a first portion forming the dispensing opening from which the particulate material falls, said first portion including an arcuate part having a radius of curvature about that of the rotor periphery, said housing having a second portion that is movable with respect to the first portion between a first position that closes the dispensing opening and a second position that opens the dispensing opening, said second portion being lockable in the first position with an over-center actuating mechanism, said rotor having a fixed location with respect to the container opening, and said first portion of the housing extending from its arcuate part into a straight part extending away from the rotor and to the bottom edge of the dispensing opening so as to form a reservoir between the rotor and the housing adjacent to such edge to reduce pulsation in the flow of particulate material over the edge, and said first portion of the housing being hinged to the remainder of the housing at its end remote from the dispensing edge, and means to adjust the first portion toward and away from the rotor to vary the volume of such reservoir.

8. The airborne apparatus for dispensing particulate materials comprising:

means including a horizontal rotor partially encompassed by a housing adjacent the bottom of a container carried by an aircraft and in communication, through a container opening, with the interior of the container, to unformly deliver the particulate material from the container to a dispensing opening;

a housing partially encompassing the rotor and forming the dispensing opening, said housing having a first portion forming the dispensing opening from which the particulate material falls, said first portion including an arcuate part having a radius of curvature approximating that of the rotor periphery hinged to the remainder of the housing for movement between a first position that closes the dispensing opening and a second position that opens the dispensing opening, and an over-center mechanism including an actuator movably carried by the housing and a resilient operator connected to the second housing portion at one end and connected to the actuator at the other end, said actuator being movable in one direction to move the second housing portion to its second position and movable in the opposite direction to move the second housing portion to its first position and to flex the resilient operator as the actuator is moved over-center where the flexure of the resilient operator holds the second housing portion in its first position.

9. The airborne apparatus for dispensing particulate materials comprising:

means including a horizontal rotor partially encompassed by a housing adjacent the bottom of a container carried by an aircraft and in communication, through a container opening, with the interior of the container, to uniformly deliver the particulate material from the container to a dispensing opening; and a housing partially encompassing the rotor and forming the dispensing opening, said housing having a first portion forming the dispensing opening from which the particulate material falls, said first portion including an arcuate part having a radius of curvature about that of the rotor periphery, said housing having a second portion hinged to the remainder of the housing for movement between a first position that closes the dispensing opening and a second position that opens the dispensing opening, and an over-center actuating mechanism including a resilient bent rod pivotally connected at one end to the second housing portion and pivotally connected at the other end to an actuating lever, said actuating lever being carried by an axle supported by the remainder of the housing and being rotatable in one direction to move the bent rod to carry the second housing portion to its second position and rotatable in the opposite direction to move the bent rod to carry the second housing portion to its first position, and further rotatable in said opposite direction to flex the bent rod and move the connection between the bent rod and the actuating lever to an over-center position beyond a line through the pivotal connection at said one end of the bent rod and said axle to lock the second housing portion in its first position through the resilience of the bent rod.

10. An airborne apparatus for dispensing agricultural materials in controllable particulate dosages comprising:

a container for the particulate agricultural material mounted in an aircraft;

means to uniformly deliver the particulate material from the container to a dispensing opening, including a horizontal rotor adjacent the bottom of the container and in communication with the interior of the container, said means including a housing in communication with the interior of the container through a container opening and partially encompassing the rotor and also forming the dispensing opening, said housing having a first portion forming a dispensing edge of the dispensing opening from which the particulate material falls, said first portion being hinged to the remainder of the housing and including an arcuate part adjacent the hinge having a radius of curvature approximating that of the rotor periphery and a straightened part adjacent the dispensing edge, said housing having a second portion also hinged to the remainder of the housing and being adapted to engage the dispensing edge of the first portion, thereby forming a gate to block the dispensing opening, said straightened part of the first portion forming, between the periphery of the rotor and the dispensing edge of the dispensing opening, a reservoir to reduce pulsations in the flow of particulate material over said dispensing edge; and a resilient bent rod connected at one end with the second portion of the housing and at the other end with a pivotally mounted actuator lever adapted to move to an over-center gate-closing position, such movement being effective to stress said resilient rod and to carry the point of connection of said other end across a line through the connection at said one end and the center about which the actuator lever pivots, thereby locking the second portion of the housing in contact with the first housing portion.

* * * * *